(12) United States Patent
Hoppert et al.

(10) Patent No.: US 10,404,470 B2
(45) Date of Patent: Sep. 3, 2019

(54) SIGNATURE VERIFICATION OF FIELD-PROGRAMMABLE GATE ARRAY PROGRAMS

(71) Applicant: Microsoft Technology Licensing, LLC, Redmond, WA (US)

(72) Inventors: Hadden Mark Hoppert, Bellevue, WA (US); Christopher L. Huybregts, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 296 days.

(21) Appl. No.: 15/406,122

(22) Filed: Jan. 13, 2017

(65) Prior Publication Data
US 2018/0205553 A1    Jul. 19, 2018

(51) Int. Cl.
*H04L 29/06*        (2006.01)
*H04L 9/32*         (2006.01)
(Continued)

(52) U.S. Cl.
CPC ............ *H04L 9/3247* (2013.01); *G06F 21/12* (2013.01); *G06F 21/44* (2013.01); *G06F 21/51* (2013.01);
(Continued)

(58) Field of Classification Search
CPC ..................................................... H04L 9/3247
(Continued)

(56) References Cited

U.S. PATENT DOCUMENTS 7,150,011 B2   12/2006   Ha et al.
8,225,153 B2   7/2012    Redondo et al.
(Continued)

FOREIGN PATENT DOCUMENTS

CN    105335211 A    2/2016
KR    20140119356 A  10/2014

OTHER PUBLICATIONS

NPL—Hypervisor mechanism to Manage FPGA Reconfiguration—by Xia @ Dec. 7, 2016.*
(Continued)

*Primary Examiner* — Longbit Chai
(74) *Attorney, Agent, or Firm* — Liang IP, PLLC

(57) ABSTRACT

Techniques for signature verification of field-programmable gate array (FPGA) programs are described herein. In one or more implementations, an FPGA virtualization manager of a host device receives a request from a virtual machine for an FPGA program to program FPGAs of the host. The FPGA program is configured to program the FPGAs to provide functionality of a hardware-implementation of a respective program (e.g., a machine-learning algorithm) or of a respective device (e.g., a graphics processing unit). Before allowing the FPGA program to program the FPGAs, however, the FPGA virtualization manager determines whether the FPGA program is trusted to do so. To do so, the FPGA virtualization manager verifies a digital signature associated with the FPGA program. When the signature is verified the FPGA program is determined to be trusted. Based on such a determination, the FPGA virtualization manager loads the FPGA program to program the FPGAs to provide the functionality.

20 Claims, 6 Drawing Sheets

(51) Int. Cl.
　　　H04L 9/14　　　　(2006.01)
　　　G06F 21/44　　　(2013.01)
　　　G06F 21/12　　　(2013.01)
　　　G06F 21/51　　　(2013.01)
　　　G06F 21/64　　　(2013.01)
　　　G06F 21/76　　　(2013.01)
(52) U.S. Cl.
　　　CPC .............. *G06F 21/64* (2013.01); *G06F 21/76*
　　　　　　　　　　(2013.01); *H04L 9/14* (2013.01)
(58) Field of Classification Search
　　　USPC ........................................................ 713/176
　　　See application file for complete search history.

(56)　　　　　　　References Cited

U.S. PATENT DOCUMENTS

| | | | |
|---|---|---|---|
| 8,356,351 B2 | 1/2013 | Fu et al. | |
| 8,406,682 B2 | 3/2013 | Elesseily et al. | |
| 8,635,675 B2 | 1/2014 | Kruglick | |
| 8,898,480 B2 * | 11/2014 | LaMacchia | G06F 21/57 |
| | | | 713/190 |
| 8,924,907 B1 * | 12/2014 | Jahnke | G06F 17/504 |
| | | | 716/116 |
| 9,286,444 B2 | 3/2016 | Ogg et al. | |
| 9,361,416 B2 | 6/2016 | Fine et al. | |
| 9,483,282 B1 | 11/2016 | Vandervennet et al. | |
| 2003/0061401 A1 | 3/2003 | Luciani, Jr. | |
| 2009/0300613 A1 | 12/2009 | Doi | |
| 2011/0041030 A1 | 2/2011 | Ko et al. | |
| 2011/0106522 A1 | 5/2011 | Chinya et al. | |
| 2013/0346758 A1 | 12/2013 | LaMacchia et al. | |
| 2014/0215424 A1 * | 7/2014 | Fine | G06F 17/5054 |
| | | | 716/117 |
| 2016/0098505 A1 | 4/2016 | Larzul | |
| 2016/0210167 A1 | 7/2016 | Bolic et al. | |
| 2016/0239324 A1 | 8/2016 | Tsirkin | |
| 2018/0196951 A1 | 7/2018 | Hoppert | |

OTHER PUBLICATIONS

"International Search Report and Written Opinion Issued in PCT Application No. PCT/US2017/068618", dated Mar. 8, 2018, 12 Pages.

Eguro, et al., "FPGAS for Trusted Cloud Computing", In Proceedings of IEEE International Conference on Field Programmable Logic and Applications, Aug. 1, 2012, 8 pages.

Chen, et al., "Enabling FPGAs in the Cloud", In Proceedings of the 11th ACM Conference on Computing Frontiers, May 20, 2014, 10 pages.

Evtyushkin, et al., "Iso-X: A Flexible Architecture for Hardware-Managed Isolated Execution", In Proceedings of 47th Annual IEEE/ACM International Symposium on Microarchitecture, Dec. 13, 2014, 13 pages.

Waller, et al., "Policy Based Management for Security in Cloud Computing", In FTRA International Conference on Secure and Trust Computing, Data Management, and Application, Jun. 28, 2011, 8 pages.

Jain, et al., "SoK: Introspections on Trust and the Semantic Gap", In Proceedings of IEEE Symposium on Security and Privacy, May 18, 2014, 16 pages.

"RC3E: Design and Test Automation in the Cloud", Retrieved from: <<https://tu-dresden.de/ing/informatik/ti/vlsi/ressourcen/dateien/dateien_alt/rc3e/dateien/RC3E_DATE_16.pdf?lang=en>>, Oct. 3, 2016, 1 Page.

"Final Office Action Issued in U.S. Appl. No. 15/405,176", dated Feb. 26, 2019, 16 Pages.

"Non Final Office Action Issued in U.S. Appl. No. 15/405,176", dated Dec. 17, 2018, 16 Pages.

Byma, Stuart A., "Virtualizing FPGAs for Cloud Computing Applications", In Master Thesis of University of Toronto, 2014, 85 Pages.

Byma, et al., "FPGAs in the Cloud: Booting Virtualized Hardware Accelerators with Open Stack", In Proceedings of IEEE 22nd Annual International Symposium on Field-Programmable Custom Computing Machines, May 11, 2014, pp. 109-116.

Koch, Dirk, "FPGA Virtualization for Enabling General Purpose Reconfigurable Computing", Retrieved from:<<http://cc.doc.ic.ac.uk/resh16/Dirk.pdf>>, Oct. 3, 2016, 26 Pages.

"International Search Report and Written Opinion Issued in PCT Application No. PCT/US2017/068615", dated Mar. 26, 2018, 11 Pages.

Wang, Wei, "Accessing an FPGA-based Hardware Accelerator in a Paravirtualized Environment", In Doctoral Dissertation of University of Ottawa, 2013, 104 Pages.

* cited by examiner

300

SIGNATURE VERIFICATION OF FIELD-PROGRAMMABLE GATE ARRAY PROGRAMS

BACKGROUND

In general, virtualization technologies have severed the one-to-one link between physical computing devices and operating systems by abstracting physical resources into virtualized resources. Virtualization allows multiple operating system instances or instances of an application to exist simultaneously on a same physical machine and in isolation from one another. Virtualization also enables multiple operating system instances to share a physical device's resources, such as to share storage devices, processing devices (e.g., graphics processing units (GPUs)), and networking devices. These advances have led to the centralization of many computing resources, enabling various computing tasks to be performed "over the cloud."

By way of example, individuals associated with an enterprise may be given accounts that allow them to access an enterprise-configured desktop interface—the desktop interface may be configured to provide productivity tools selected by the enterprise, storage hosted by the enterprise, and so on. The desktop interface associated with a given individual may also be accessible via multiple different computing devices, e.g., a desktop device at work, a laptop device at home, or a tablet device while traveling. Though accessible from these multiple different computing devices, the functionality provided by the desktop interface may be furnished largely using the processing and storage resources of the enterprise's servers, rather than resources of the computing devices the individuals interact with directly. Moreover, virtualization techniques enable the processing and storage resources of these same servers to be leveraged further to provide personal desktop interfaces simultaneously to multiple individuals of the enterprise. Advances continue to be made in virtualization technologies, such as improving the speed with which computing tasks can be completed using virtual machines or reducing the cost of implementing systems by employing virtual machines. Nonetheless, some conventional techniques for implementing virtualization are expensive, vulnerable to security breaches, allow host devices to access information of hosted virtual machines, or tied to particular host-device hardware configurations. Consequently, virtualization may not be leveraged for many applications.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Techniques for signature verification of field-programmable gate array (FPGA) programs are described herein. In one or more implementations, an FPGA virtualization manager of a host device receives a request from a virtual machine for an FPGA program to program FPGAs of the host. The FPGA program is configured to program the FPGAs to provide functionality of a hardware-implementation of a respective program (e.g., a machine-learning algorithm) or of a respective device (e.g., a graphics processing unit). Before allowing the FPGA program to be loaded to program the FPGAs, however, the FPGA virtualization manager determines whether the FPGA program is trusted. To do so, the FPGA virtualization manager verifies a digital signature associated with the FPGA program. When the signature is verified the FPGA program is determined to be trusted. Based on such a determination, the FPGA virtualization manager loads the FPGA program to program the FPGAs to provide the functionality of the hardware-implementation of the program or of the device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
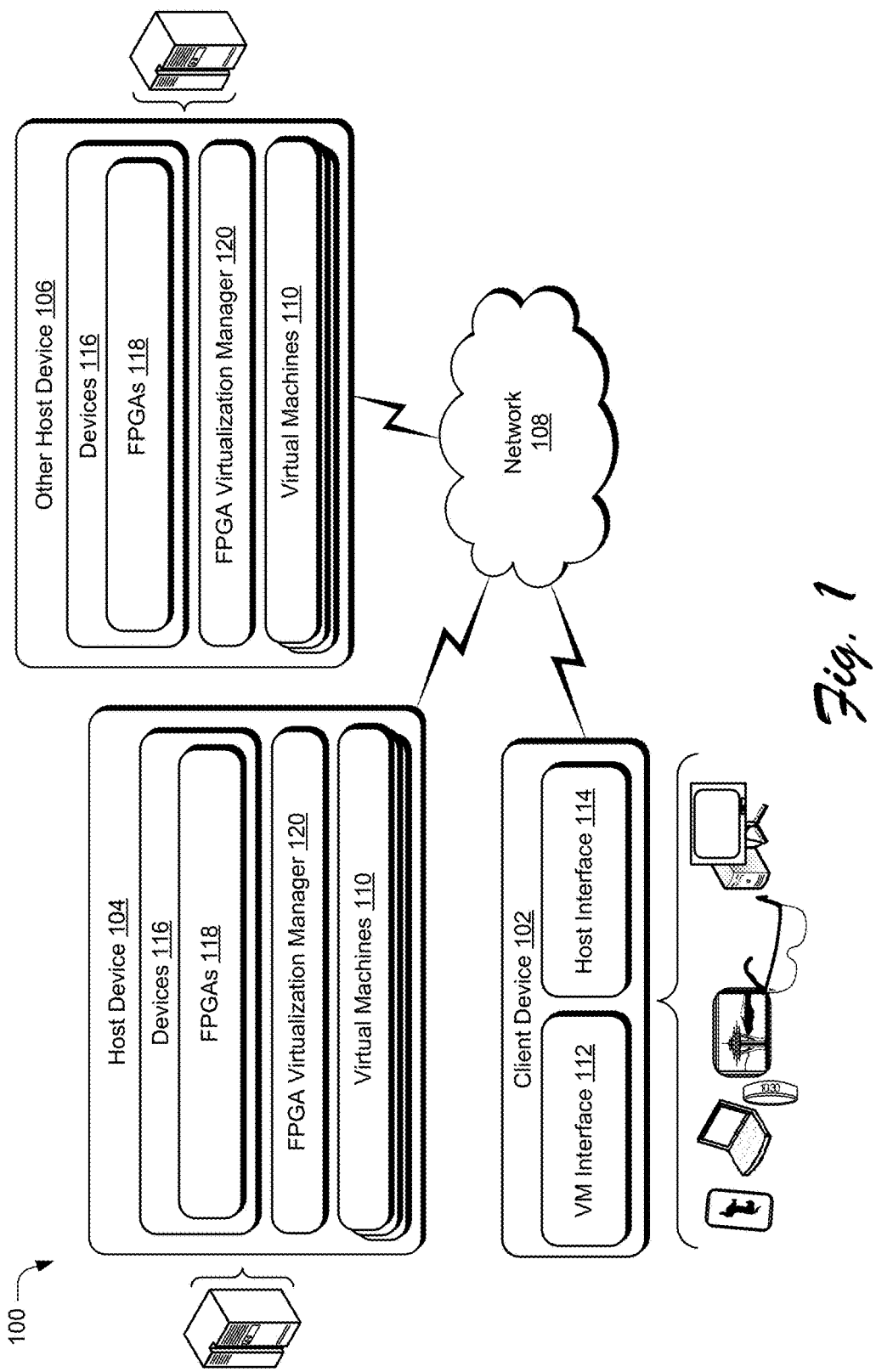
FIG. 1 is an illustration of an environment in an example implementation that is operable to employ techniques described herein.

Advances continue to be made in virtualization technologies, e.g., improving the speed with which computing tasks can be completed using virtual machines, reducing the cost of implementing systems by employing virtual machines, and decoupling functionality from particular host hardware configurations. Nonetheless, some conventional techniques for implementing virtualization may be prohibitive to more widespread adoption. In general, virtualization can be implemented by host devices that furnish a host operating system. Under the host operating system, multiple guest operating systems can be instantiated. These guest operating systems may be referred to as "virtual machines," emulating computing devices and providing the functionality of physical computers.

In connection with providing such functionality, virtual machines typically leverage the physical devices of a respective host device. Host devices configured according to conventional techniques may include a variety of different physical devices to furnish virtual machines with a wide range of desired functionality. Examples of such physical devices include storage devices, processing devices (graphics processing units (GPUs)), and networking devices. However, conventional techniques may be limited to providing functionality of the physical devices with which a corresponding host device is configured. Field-programmable gate arrays (FPGAs) may be used to expand the functionality of host devices without having to configure them to include particular physical devices to provide corresponding functionality. Rather, the FPGAs may be programmable to provide the functionality of multiple different physical devices. Additionally, FPGAs may be programmed to run algorithms at a hardware level rather than with a central processing unit (CPU)—thereby increasing the algorithms' speed, efficiency, and so on. Due to their flexibility, however, FPGAs may be easily programmed to crash a host device and/or expose the host to security breaches. Further, FPGA programs may be capable of causing such vulnerabilities maliciously or by accident. Regardless, allowing virtual machines to program FPGAs to have such vulnerabilities is undesirable.

Accordingly, signature verification of FPGA programs is described. In one or more implementations, a virtual machine requests from a host device some functionality that can be provided by the host's FPGAs. By way of example, the virtual machine may request that the host load and run a particular program on the FPGAs, such as a program for machine learning, encryption, compression, or redundancy. Virtual machines may also request that the host load an FPGA program that configures the FPGAs as a particular physical device, such as a GPU. Before loading an FPGA program, however, the described techniques determine whether the FPGA program is trusted. If a determination is made that the FPGA program is trusted, it is loaded and run on the FPGAs. If a determination is made that the FPGA program is not trusted, however, the described techniques prohibit the program from being loaded to the FPGAs and run.

This trust determination indicates that the host device trusts the FPGA program not to expose the FPGAs to the above-described vulnerabilities. By way of example, a determination that an FPGA program is trusted indicates that the host device trusts the FPGA program not to crash the host. Broadly speaking, host devices trust FPGA programs that have been developed by a respective host provider as well as trusted FPGA-program providers, such as providers that have a reputation for developing trusted programs and/or are incentivized to provide trusted programs. A host device provider may specify a list of FPGA programs and/or a list of FPGA-program providers that are trusted, for example. Further, such a list may be maintained by the hosts to make trust determinations.

In any case, the techniques described herein use digital signatures to verify that an FPGA program requested by a virtual machine corresponds to a program the host explicitly trusts or to an FPGA-program provider the host trusts. Further the digital signatures are used to verify that the program has not been modified, e.g., maliciously or otherwise to expose vulnerabilities at the host. Consider an example in which a virtual machine requests an FPGA program maintained in storage by the host device or accessible to the host device. In general, FPGA programs maintained by the host device or in a trusted storage location are considered trusted. Thus, in this example the virtual machine may simply provide a unique identifier of the FPGA program in the request. The host may then obtain the FPGA program from the trusted storage using the identifier, and load the FPGA program to the FPGAs of the host. In this scenario, the unique identifier is sufficient as a digital signature because the FPGA program is maintained at the host—indicating the FPGA program is trusted to be loaded to and run on the host's FPGAs.

In some scenarios, however, a requested FPGA program may not be maintained in storage at or accessible to a host. Instead, the FPGA program may be included as part of the request. In such cases, the host device may be provided with a key for the FPGA program from a provider of the FPGA program—the key may be unique and known only to the provider of the FPGA program and the host. Using the key, the FPGA-program provider may encrypt the FPGA program. The encrypted data acts as a digital signature—successful decryption of the encrypted data using the key indicates that the FPGA program has not been modified since leaving the FPGA-program provider and is trusted, while unsuccessful decryption indicates that the encrypted data may have been modified and is not to be trusted. When the host receives the request with the FPGA program from the virtual machine, the host attempts to decrypt the FPGA program using the key. If decryption is successful, the host determines that the FPGA program is trusted and loads the program to the FPGAs to run. If decryption is not successful, the host determines that the FPGA program is not trusted and prohibits the FPGA program from being loaded to the FPGAs. After a program is loaded, the host exposes the functionality to the requesting virtual machine, for example, as a virtual device.

Utilizing the techniques described herein, host device configuration may not only be simplified, but functionality provided to virtual machines may be improved. Rather than configuring host devices with a variety of different physical devices to provide corresponding functionality, the described techniques allow host devices to be configured with FPGAs to provide the functionality of various different physical devices. Additionally, allowing virtual machines to leverage FPGAs to run algorithms at a hardware level can improve performance of those algorithms in terms of speed and efficiency. This can result in a number of efficiencies for systems that employ FPGA virtualization, such as reducing costs because fewer pieces of hardware may be needed to support a same number of virtual machines, reducing equipment footprint, reducing power consumption, and improving the speed with which virtual machines deliver functionality to clients.

In the following discussion, an example environment is first described that may employ the techniques described herein. Example procedures and implementation details are then described which may be performed in the example environment as well as other environments. Consequently, performance of the example procedures and details is not limited to the example environment and the example environment is not limited to performance of the example procedures and details.

Example Environment

FIG. 1 illustrates an operating environment in accordance with one or more embodiments, generally at 100. The environment 100 includes a client device 102 which can be embodied as any suitable device, such as a desktop, a smartphone, a tablet computer, a portable computer (e.g., a laptop), a desktop computer, a set-top box, a game console, or a wearable device. Thus, the computing device may range from full resource devices with substantial memory and processor resources (e.g., personal computers, game consoles) to a low-resource device with limited memory and/or processing resources (e.g., traditional set-top boxes, handheld game consoles). Additionally, although a single computing device is shown in some instances, the computing device may be representative of a plurality of different devices, such as multiple servers of a service provider utilized by a business to perform operations, provide a datacenter, and so on. Further examples of computing systems and devices suitable to implement techniques described herein are described below in relation to FIG. 6.

The environment 100 further includes host device 104 and other host device 106. The host device 104 and the other host device 106 may be implemented by one or more computing devices, such as one or more servers of a datacenter, and may also be representative of one or more entities. In accordance with one or more implementations, the host device 104 and the other host device 106 may represent functionality of a service provider to provide one or more services to the client device 102 over network 108. In general, service providers may make a variety of resources (e.g. content and services) available to clients of the network 108, which may include the hosts in some instances. Generally, resources made accessible by a service provider may include any suitable combination of services and/or content typically made available over a network by one or more providers. Some examples of services include, a virtual networking service (e.g., cloud computing), a streaming content service, a data storage service, a search service, an email service, an instant messaging service, an online productivity suite, and an authentication service to control access of clients to the resources. Content may include various combinations of text, multi-media streams, documents, application files, photos, audio/video files, animations, images, web pages, web applications, device applications, content for display by a browser or other client application, and the like.

Although the network 108 is illustrated as the Internet, the network may assume a wide variety of configurations. For example, the network 108 may include a wide area network (WAN), a local area network (LAN), a wireless network, a public telephone network, and/or an intranet. Further, although a single network 108 is shown, the network 108 may be configured to include multiple networks.

The host device 104 and the other host device 106 are each illustrated as including virtual machines 110. The virtual machines 110 may be implemented as part of providing the above-mentioned services. Additionally, the virtual machines 110 may be implemented by virtual machine managers (not shown) of the host device 104 and the other host device 106. In general, a virtual machine manager may be capable of managing the creation (referred to herein as "instantiation"), operation, and termination of the virtual machines 110. In at least some implementations, the virtual machine managers are configured as instances of hypervisor that run on a respective host device. Further, the virtual machines 110 represent instances of virtual machines hosted by respective host devices.

To enable interactions between the client device 102 and the virtual machines 110, the client device 102 includes a virtual machine interface 112 (VM interface 112). According to various implementations, the VM interface 112 represents functionality to expose one or more of the virtual machines 110 to the client device 102. By way of example, the VM interface 112 generates a graphical user interface (GUI) via which a user may interact with at least one of the virtual machines 110, such as to provide input to the virtual machine and consume output from the virtual machine.

The client device 102 is also depicted having host interface 114, which represents functionality to enable the client device 102 to interface with the host device 104 and/or the other host device 106 outside of the virtual machines 110. For instance, the host interface 114 supports functionality to request that a virtual machine manager instantiate one of the virtual machines 110 for the client device 102. The host interface 114 may also provide other functionality to the client device 102, such as enabling the status of different virtual machines to be determined and/or manipulated. The host interface 114 may provide a virtual machine interface, for instance, that indicates a status of different virtual machines to which the client device 102 is permitted visibility. Although the illustrated environment 100 includes the client device 102, in some implementations the described techniques may be utilized for applications that do not involve client devices. Instead, the virtual machines 110 of the host device 104 may interact with one another (or the virtual machines of the other host device 106) via command queues. Such interactions may involve pushing and/or pulling data to a service run locally by one of the virtual machines 110.

At some level, the functionality and/or services provided via the virtual machines 110 are provided, at least in part, using actual physical devices of the host device 104 and the other host device 106. Although devices 116 may include a variety of different physical devices to provide a range of functionality, the devices 116 also include field-programmable gate arrays 118 (FPGAs 118). In accordance with one or more implementations, the FPGAs 118 are programmable dynamically to run different programs or algorithms at a hardware level, such as encryption, compression, machine learning, and redundancy. The FPGAs 118 are also programmable to provide the functionality of different physical devices, such as different graphics processing units, different networking devices, and so forth.

Additionally, a portion of an FPGA 118 may be programmable to run one program or provide the functionality of a particular physical device while another portion is programmable to run an additional program (or additional instance of the same program) or provide the functionality of a different physical device. In this way, a single FPGA 118 may be programmable to run multiple different requested programs simultaneously, e.g., both an encoding and compression engine or multiple different GPUs. Not only may a single FPGA 118 be programmable to run multiple programs simultaneously, but multiple FPGAs 118 or portions of multiple FPGAs 118 may be programmed collectively with a program to provide some functionality, such as to enable deep learning for generating a neural network.

The host device 104 and the other host device 106 are also each illustrated with an FPGA virtualization manager 120. In one or more implementations, the FPGA virtualization manager 120 is part of the above-discussed virtual machine manager. In accordance with the described techniques, the FPGA virtualization manager 120 virtualizes the FPGAs 118 to the virtual machines 110. In other words, the FPGA virtualization manager is configured to facilitate programming the FPGAs 118 with a requested FPGA program and expose the program (or the device programmed to the FPGAs 118) to the virtual machines 110. In connection with facilitating this interaction, the FPGA virtualization manager 120 determines whether requested FPGA programs are trusted.

As mentioned above, simply allowing any FPGA program to program the FPGAs 118 can make the system (e.g., the host device 104, the other host device 106, the client device 102, and the components thereof) vulnerable to security breaches, both maliciously and accidentally. Such security breaches may crash the system or expose sensitive information (e.g., personally identifying information, confidential business information, financial information). Based on this, the FPGA virtualization manager 120 limits the FPGA programs that are allowed to program the FPGAs 118 to those that are determined to be trusted. The FPGA virtualization manager 120 does not allow FPGA programs that are not trusted to program the FPGAs. As discussed in more detail below, the FPGA virtualization manager 120 is capable of determining whether a requested FPGA program is trusted using digital signatures.

Assuming though that an FPGA program is trusted and allowed to program the FPGAs 118, the FPGA virtualization manager 120 may expose the programmed FPGAs 118 as a virtual device to the virtual machines 110. Virtual devices enable the virtual machines 110 to access functionality of the programs or devices programmed to the FPGAs 118. When the FPGAs 118 are programmed as a GPU for instance, the virtual devices allow the virtual machines 110 to request graphics processing from the GPU. To the virtual machines 110, the virtual devices emulate actual physical devices. Further, by programming a portion of a single FPGA 118 as a particular physical device and presenting just the programmed portion to an individual virtual machine as a full virtual device, the functionality of the FPGA can be shared among multiple virtual machines 110.

In accordance with one or more implementations, the host device 104 and/or the other host device 106 may be configured with a virtual peripheral component interconnect (PCI) infrastructure. In such scenarios, the FPGA virtualization manager 120 can use the virtual PCI infrastructure to expose the programmed FPGAs 118 as physical devices to the virtual machines 110. In so doing, the FPGA virtualization manager 120 may expose portions of the FPGAs 118 by presenting virtual devices in a way that mimics PCI Express (PCIe) devices.

Furthermore, the FPGA virtualization manager 120 is capable of virtualizing the FPGAs 118 and exposing the programmed portions to virtual machines hosted by different host devices. By way of example, the host device 104's FPGA virtualization manager 120 may allow the virtual machines 110 of the other host device 106 to request an FPGA program, resulting in programming the FPGAs 118 of the host device 104. In a similar manner, the other host device 106's FPGA virtualization manager 120 may allow the virtual machines of the host device 104 to request an FPGA program, resulting in programming the FPGAs 118 of the other host device 106.

By accessing programs and device functionality via virtual devices, the virtual machines 110 can leverage virtual devices provided using the FPGAs 118 of multiple host machines, including remote host machines. To this extent, the virtual machines 110 are not therefore tied to any specific physical device of a host. Since the virtual machines 110 are not tied to any specific physical device, the virtual machines 110 can migrate across different host devices. The virtual machines 110 may do so, for instance, based on the availability of the FPGAs 118 to be programmed.

Having described an example operating environment, consider now example details and techniques associated with one or more implementations.

Signature Verification for Field-Programmable Gate Array Programs

To further illustrate, consider the discussion in this section of example scenarios, components, and procedures that may be utilized to verify digital signatures for field-programmable gate array (FPGA) programs. In general, functionality, features, and concepts described in relation to the examples above and below may be employed in the context of the example procedures described below. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Scenario

Figure 2:
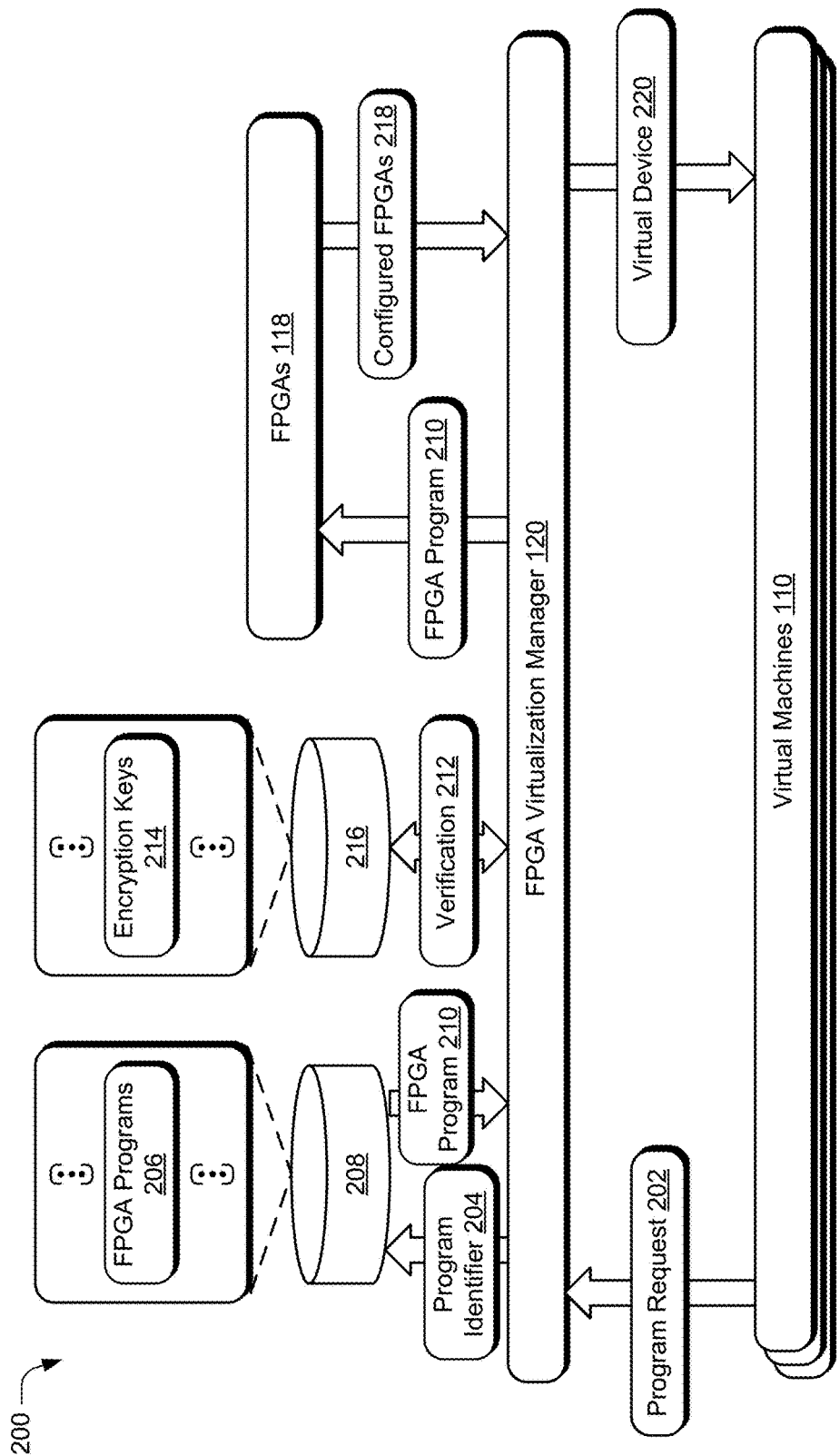
FIG. 2 is a diagram depicting an example scenario in which field-programmable gate arrays (FPGAs) of a host are configured to provide a virtual machine with requested functionality in accordance with one or more implementations.

FIG. 2 depicts generally at 200 an example scenario in which FPGAs of a host device are configured to provide a virtual machine with requested functionality in accordance with one or more implementations. The example scenario 200 includes, from FIG. 1, the virtual machines 110, the FPGAs 118, and the FPGA virtualization manager 120.

The example scenario 200 also includes program request 202 communicated from the virtual machines 110 to the FPGA virtualization manager 120. The program request 202 represents a request to run an FPGA program on the FPGAs 118, e.g., to leverage the speed and efficiency of the FPGAs 118 (to run a machine learning algorithm) or provide the functionality of a particular device (such as a GPU). The program request 202 may be configured in a variety of different formats as discussed in relation to FIGS. 3A and 3B. For instance, the program request 202 may simply request an FPGA program maintained by the host device 104 or the other host device 106. In other scenarios, the program request 202 may include an FPGA program that the FPGA manager can load (once determined trusted) and run on the FPGAs 118.

Figure 3A:
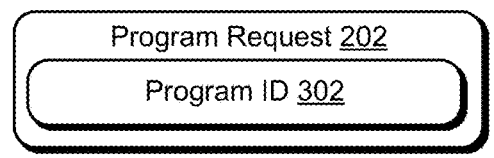
FIGS. 3A and 3B are diagrams depicting different example configurations of requests to program FPGAs to provide requested functionality in accordance with one or more implementations.

In scenarios where the program request 202 simply requests an FPGA program maintained by a host, the program request 202 may indicate program identifier 204 to the FPGA virtualization manager 120, e.g., the program request 202 may include the program identifier 204 as in FIG. 3A. The program identifier 204 is unique to and identifies a requested FPGA program. By way of example, a Brand X compression engine is associated with a unique program identifier that is different from other programs and devices which can be programmed to the FPGAs 118. The program identifier 204 may be configured as a globally unique identifier (GUID), a universally unique identifier (UUID), or a string capable of uniquely identifying requested programs. The program identifier 204 may be configured in a variety of different formats to uniquely identify an FPGA program without departing from the spirit or scope of the techniques described herein.

The FPGA virtualization manager 120 represents functionality to use the program identifier 204 to determine whether FPGA programs 206 include a program corresponding to the program request 202. The FPGA programs 206 are illustrated as being stored in storage 208, which may be included as part of the host device 104, the other host device 106, or a trusted remote storage service, for example. Accordingly, the FPGA virtualization manager 120 determines whether an FPGA program corresponding to the program identifier 204 is maintained in a trusted storage location. In this way, the program identifier 204 may serve as a digital signature of the program request 202—the FPGA virtualization manager 120 verifies that the requested FPGA program is trusted because it is found in and obtained from a trusted storage location using the program identifier 204. If a program identifier of a program request does not match any of the FPGA programs 206, the FPGA virtualization manager 120 may notify the requesting virtual machine that the requested program is not available.

If the program identifier 204 does correspond to one of the FPGA programs 206, however, the FPGA virtualization manager 120 obtains the corresponding FPGA program 210, such as from the storage 208. In general, the FPGA programs 206 represent functionality to program the FPGAs 118 with a respective program or as a respective device. The FPGA programs 206 may be configured as binary data that is capable of programming the FPGAs 118 with a respective program or as a respective device, e.g., using a hardware description language (HDL).

For scenarios where the FPGA program 210 is obtained from trusted storage, the FPGA program 210 may simply load and run the trusted FPGA program to the FPGAs 118. In other scenarios, however, the FPGA program 210 may be obtained directly from the program request 202, e.g., the FPGA program 210 may be included in the program request. In these scenarios, the FPGA virtualization manager 120 determines whether the FPGA program 210 is trusted before loading the FPGA program on the FPGAs. By way of example, the FPGA virtualization manager 120 may determine whether the FPGA program is trusted through verification 212 of a digital signature of the FPGA program 210.

The verification 212 may involve the FPGA virtualization manager 120 attempting to decrypt the FPGA program 210 using a corresponding one of encryption keys 214. The encryption keys 214 represent secrets corresponding to FPGA programs or FPGA-program providers. These secrets may be known only to the host (e.g., implementing the FPGA virtualization manager 120) and a provider of a corresponding program. The encryption keys 214 are illustrated as being stored in storage 216, which may be included as part of the host device 104, the other host device 106, or a trusted remote security-policy storage service, for example. In general, a program provider uses a respective encryption key 214 to encrypt an FPGA program. Further, only an entity having the respective encryption key 214 may be able to decrypt an encrypted FPGA program. Accordingly, if the FPGA virtualization manager 120 is able to successfully decrypt the encrypted FPGA program 210 with the corresponding encryption key 214, then the FPGA program is determined to be trusted. Successful decryption indicates, for example, that the FPGA program 210 has not been modified from an original, trusted state as provided by the program's provider. Successful decryption may also indicate an unbroken chain of trust, e.g., that the encryption key is trusted, the FPGA program 210 is trusted, the provider of the FPGA program 210 is trusted, and the virtual machine requesting the FPGA program 210 be loaded to the FPGAs 118 is trusted.

If the verification 212 indicates that the FPGA program 210 is not trusted, then the FPGAs 118 are not programmed using the FPGA program 210. In this case, the FPGA virtualization manager 120 may generate a notification indicating that the FPGA program 210 is not trusted, and, accordingly, that the request to program the FPGAs 118 cannot be satisfied. This notification can then be provided to the requesting virtual machine 110, which can trigger an error condition, cause the virtual machine to request a different FPGA program, and so forth.

If, however, the verification 212 indicates that the FPGA program 210 is trusted, then the FPGA program 210 is allowed to program the FPGAs 118 to run the requested program or as the requested device. In connection with this, the FPGA virtualization manager 120 allocates at least a portion of the FPGAs 118 to the FPGA program 210. The allocated portion of the FPGAs 118 corresponds to those that are programmed to run the requested program or provide functionality of the requested device. The allocated portion may correspond to less than entirety of a single FPGA 118 or may correspond to an entire FPGA 118. In some cases, the allocated portion may correspond to less than an entirety of multiple different FPGAs 118 (e.g., a quarter of first FPGA and a quarter of a second FPGA), to an entire FPGA and less than an entirety of at least one other FPGA, and so forth. In other words, the FPGA virtualization manager 120 allocates a quantity of programmable logic blocks of the FPGAs 118 to enable the requested FPGA program to be programmed thereto. The logic blocks can be programmed to have different hardware functions, such as to serve as input, output, storage, or logic.

Once a portion of the FPGAs 118 is allocated to the FPGA program 210, the FPGA virtualization manager 120 loads the FPGA program 210. In one or more implementations, the FPGA program 210 is configured as a binary-data program that is capable of programming the FPGAs 118 to run the requested program or as the requested device.

The illustrated scenario 200 also depicts configured FPGAs 218. The configured FPGAs 218 represent that the FPGAs 118 have been configured by the FPGA program 210 to run the requested program or as the requested device. A signal may be provided to or obtained by the FPGA virtualization manager 120 that indicates the FPGAs 118 are successfully configured. Based on this, the FPGA virtualization manager 120 may expose the configured FPGAs 218 (configured to run the requested program or as the requested device) to the virtual machines 110 as virtual device 220. The virtual machines 110 may interact with the virtual device 220 to leverage the program or functionality of the device programmed to the FPGAs 118. To do so, the FPGA virtualization manager 120 may map inputs of the virtual device 220 to inputs of the configured FPGAs 218 and outputs of the virtual device 220 to outputs of the configured FPGAs 218. Based on this mapping, the FPGA virtualization manager 120 can relay data between the virtual machines 110 and the configured FPGAs 218 to provide the functionality of the requested program or device to the virtual machines, e.g., a trained neural network if machine learning is requested, graphics processing if a GPU is requested, handling network traffic if a networking device is requested, or compressed data if data compression is requested.

Example FPGA Program Requests

Figure 3B:
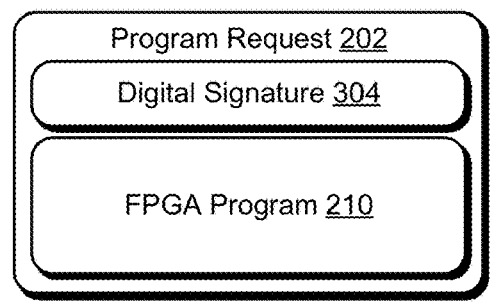

FIGS. 3A and 3B depict examples generally at 300 of requests for FPGA programs in accordance with one or more aspects. Both FIGS. 3A and 3B include the program request 202. The program request 202 is configured differently in FIG. 3A than in FIG. 3B, however, and thus represent different scenarios for digital signature verification.

In FIG. 3A, the program request 202 includes program identifier 302 (program ID 302), which may correspond to the program identifier 204. The program ID 302 represents information for identifying an FPGA program, e.g., from the FPGA programs 206 maintained by the host device or accessible to the host device from another trusted storage location. In scenarios, such as the one illustrated by FIG. 3A, the program ID 302 can serve as a digital signature. This is because when a corresponding program is found from the FPGA programs 206 using the program identifier 302, the found program is trusted. The found program is trusted because it is obtained from a trusted location, e.g., the storage 208 of the FPGA virtualization manager 120's host or another trusted source.

FIG. 3B represents a different signature-verification scenario. In FIG. 3B, the program request 202 includes the FPGA program 210. The program request 202 is also illustrated with digital signature 304 in FIG. 3B. The digital signature 304 represents that the FPGA program 210 digitally signed in some way that the FPGA virtualization manager 120 can use for determining whether the FPGA program 210 is trusted—and thus allowed to be loaded to program the FPGAs 118. In accordance with one or more implementations, the digital signature 304 may correspond to encryption of the FPGA program 210, e.g., using a key known to the provider of the FPGA program 210 and also the host system that decrypts the FPGA program 210, such that if the host is able to successfully decrypt the FPGA program 210 using the key the FPGA program 210 is determined to be trusted. The digital signature 304 may also indicate a chain of trust, e.g., that the FPGA program 210 included in the program request 202 has only been handled by entities that did not modify (intentionally or unintentionally) the FPGA program 210 from its original trusted state at the FPGA-program provider. These and/or other security concerns may be checked using the digital signature 304. By ensuring that FPGA programs come from trusted sources and remain unmodified, the digital signatures can prevent FPGA programs from breaching system security, both maliciously and unintentionally.

The approach represented by FIG. 3B may be more flexible, in terms of enabling the virtual machines 110 to leverage functionality of a wide variety of different FPGA programs, than the scenario represented by FIG. 3B. Nevertheless, the techniques may utilize digital signatures associated with FPGA programs in a variety of different ways to determine whether those programs are trusted without departing from the spirit or scope of the techniques described herein. Additional examples and details are discussed in relation to the following example procedures.

Example Procedures

Figure 4:
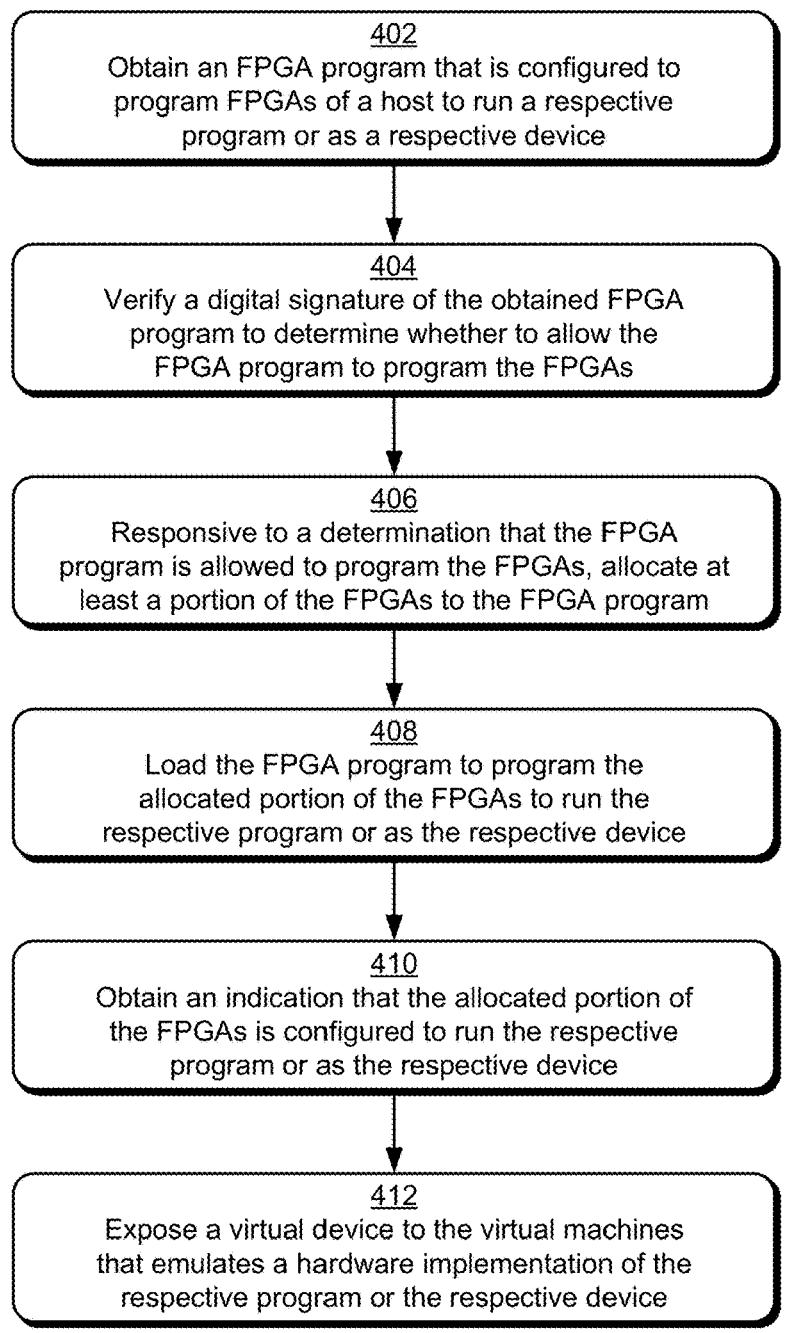
FIG. 4 is a flow diagram depicting an example procedure to verify a signature of an FPGA program in accordance with one or more implementations.
Figure 5:
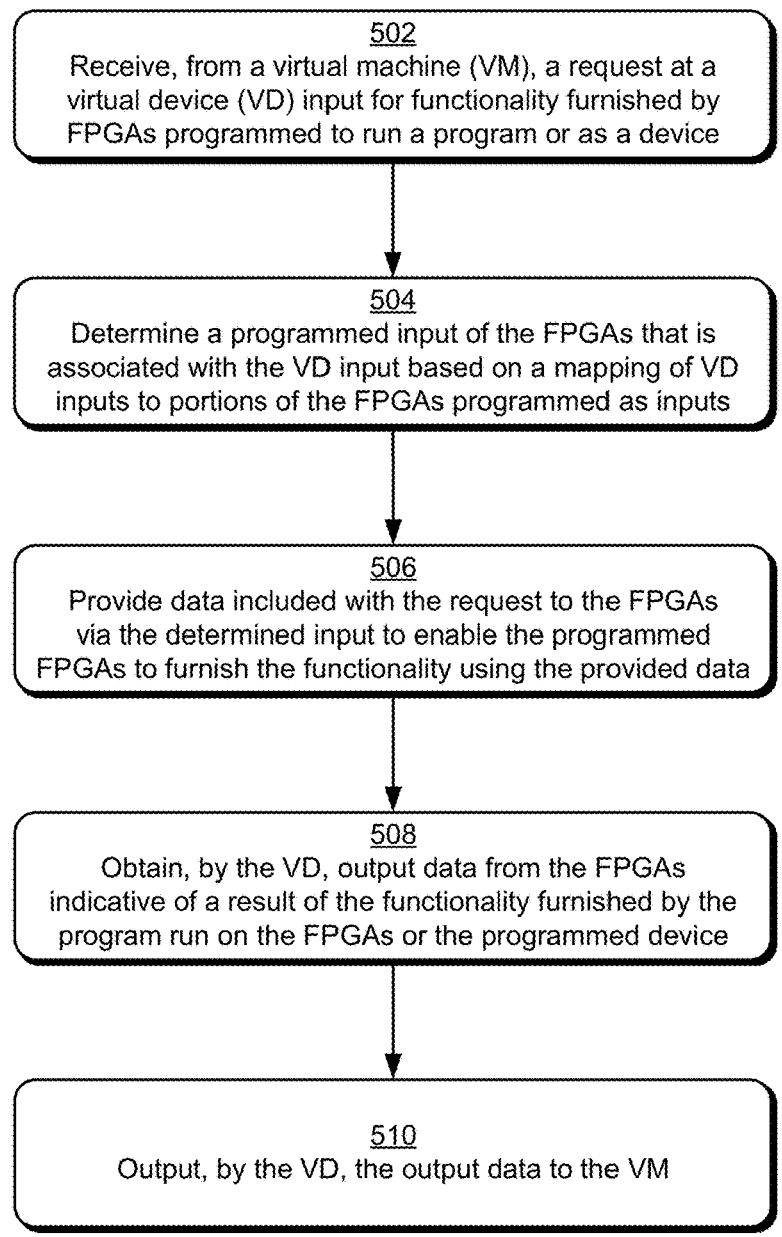
FIG. 5 is a flow diagram depicting an example procedure to leverage functionality provided by FPGAs programmed using an FPGA program with a verified signature in accordance with one or more implementations.

Further aspects of signature verification for FPGA programs are discussed in relation to example procedures of FIGS. 4 and 5. The procedures are represented as sets of blocks that specify operations performed by one or more devices and are not necessarily limited to the orders shown for performing the operations by the respective blocks. Aspects of the procedures may be implemented in hardware, firmware, or software, or a combination thereof. Some aspects of the procedures may be implemented via one or more host devices, such as via a host device 104 and/or other host device 106 that maintain and provide access to an FPGA virtualization manager 120 or otherwise. Aspects of the procedures may also be performed by a suitably configured device, such as the example client device 102 of FIG. 1 that includes or makes use of a VM interface 112 and host interface 114.

FIG. 4 depicts an example procedure 400 for verifying a signature of an FPGA program and configuring FPGAs of a host using the FPGA program responsive to verification in accordance with one or more implementations.

At 402, an FPGA program is obtained that is configured to program FPGAs of a host device to run a respective program or as a respective device. By way of example, the FPGA virtualization manager 120 obtains the FPGA program 210 from the FPGA programs 206, e.g. from the storage 208 of the host device 104 or the other host device 106. Alternately, the FPGA virtualization manager 120 obtains the FPGA program 210 directly from the program request 202, e.g., by extracting the FPGA program 210 from the program request 202. Regardless of how obtained, the FPGA program 210 is configured to program the FPGAs 118 of the host device 104 or the other host device 106 to run a respective program (e.g., a machine learning algorithm, a compression algorithm, an encryption algorithm) or as a respective device (e.g., a networking device, a processing device such as a GPU, a data storage device such as a hard drive).

At 404, a digital signature of the obtained FPGA program is verified. In accordance with the principles described herein the digital signature is verified to determine whether to allow the FPGA program to program the FPGAs. Consider the example in which the FPGA program 210 is obtained from the FPGA programs 206 maintained in the storage 208, in accordance with one or more implementations. In this example, the digital signature corresponds to the program identifier 204, which is included with the program request 202. By identifying the FPGA program 210 from the FPGA programs 206 using the program identifier 204, the program identifier 204 (serving as the digital signature) is verified. The FPGA program 210 is thus determined to be trusted. This is because the FPGA programs 206 maintained in the storage 208 have already been determined to be trusted. Accordingly, the FPGA virtualization manager 120 allows the FPGA program 210 to program the FPGAs when obtained from the FPGA programs 206. If an FPGA program is not found that corresponds to the program identifier 204, no FPGA program is loaded to the FPGAs 118 based on the program request 202.

As discussed above, in some scenarios the program request 202 may not simply provide the program identifier 204 for an FPGA program of the FPGA programs. Instead, the program request 202 may include an FPGA program that the program request 202 requests to be loaded and run on the FPGAs 118. In these scenarios, a digital signature of the FPGA program is verified differently. By way of example, the program request 202 includes the FPGA program 210, as depicted in FIG. 3B. To verify the digital signature 304, the FPGA virtualization manager 120 attempts to decrypt an encrypted version of the FPGA program 210 included in the program request 202. In particular, the FPGA virtualization manager 120 attempts to decrypt the encrypted FPGA program 210 using a corresponding one of the encryption keys 214, e.g., the encryption key with which the FPGA program 210 is encrypted by an FPGA-program provider. If the FPGA virtualization manager 120 is able to successfully decrypt the FPGA program 210 using the key, then the FPGA virtualization manager 120 verifies the digital signature and determines that the FPGA program 210 is trusted. If the FPGA virtualization manager 120 is not able to successfully decrypt the FPGA program, however, then the virtualization manager does not verify the digital signature and determines that the FPGA program is not trusted. If the FPGA program 210 is determined not to be trusted, the FPGA virtualization manager 120 does not allow the FPGA program 210 to program the FPGAs 118.

Responsive to a determination that the FPGA program is trusted, however, at 406, at least a portion of the FPGAs is allocated to the FPGA program. By way of example, the FPGA virtualization manager 120 determines at 404 that the FPGA program 210 is trusted. Responsive to this determination, the FPGA virtualization manager 120 allocates a portion of the FPGAs 118. The allocation corresponds to the portion of the FPGAs 118 that the FPGA program 210 will configure to run the respective program or configure as the respective device. In other words, the allocated portion of the FPGAs 118 is reserved for programming as the hardware implementation of the respective program or as the respective device.

At 408, the FPGA program is loaded to program the allocated portions of the FPGAs to run the respective program or as the respective device. By way of example, the FPGA virtualization manager 120 loads the FPGA program 210 to program the portion of the FPGAs 118 allocated at 406. In so doing, the FPGA program 210 configures the allocated portions of the FPGAs 118, e.g., as input, output, storage, or logic. In one or more implementations, the FPGA program 210 specifies the particular configuration of the allocated portion of the FPGAs 118 using a hardware description language (HDL).

At 410, an indication is obtained that indicates the allocated portion of the FPGAs is configured to run the respective program or as the respective device. By way of example, the FPGA virtualization manager 120 obtains an indication of the configured FPGAs 218. This represents that the FPGAs 118 have been programmed as a hardware implementation of the respective program or as the respective device, which can be leveraged by the virtual machines 110. At 412, a virtual device that emulates the hardware implementation of the respective program or emulates the respective device programmed to the FPGAs is exposed to virtual machines. By way of example, the FPGA virtualization manager 120 exposes the virtual device 220 to the virtual machines 110. The virtual device 220 enables the virtual machines to leverage the functionality of the configured FPGAs 218—the hardware implementation of the program or functionality of the device programmed to the FPGAs 118.

FIG. 5 depicts an example procedure 500 in which functionality is leveraged that is furnished by FPGAs programmed using an FGPA program with a verified signature in accordance with one or more implementations.

At 502, a request is received at a virtual-device input from a virtual machine. In accordance with the principles discussed herein, the request requests functionality furnished by a portion of FPGAs programmed to run a hardware implementation of a program or programmed as a device. By way of example, a request is received at an input of the virtual device 220 from one of the virtual machines 110. The received request requests functionality that is furnished by the configured FPGAs 218, which were configured by the FPGA program 210 after the FPGA virtualization manager 120 determines the FPGA program 210 is trusted as described above.

At 504, a programmed input of the FPGAs that is associated with the virtual-device input is determined. In accordance with the principles discussed herein, the programmed input of the FPGAs is determined based on a mapping of virtual-device input and output to respective programmed input and output of the FPGAs. By way of example, the FPGA virtualization manager 120 determines a programmed input of the configured FPGAs 218 that is associated with the input of the virtual device 220. The FPGA virtualization manager 120 makes this determination by referencing a mapping of inputs and outputs of the virtual device 220 to portions of the configured FPGAs 218 that are programmed to serve as inputs and outputs.

At 506, data included with the request is provided to the FPGAs via the determined input. In accordance with the principles discussed herein, this enables the programmed FPGAs to furnish functionality of the hardware-implemented program or programmed device using the provided data. By way of example, data corresponding to the request received at 502 is provided to the input of the configured FPGAs 218 determined at 504.

At 508, output data is obtained by the virtual device from the FPGAs. In accordance with the principles discussed herein, the output data is indicative of a result of the functionality furnished by the hardware-implemented program or device programmed to the FPGAs. By way of example, the virtual device 220 obtains data from the configured FPGAs 218. Further, the obtained data is indicative of a result of the functionality furnished by the hardware-implemented program or device programmed to the configured FPGAs 218. When the configured FPGAs 218 correspond to a GPU, for example, the output data may correspond to a rendered scene configured for display. At 510, the output data is output from the virtual device to the virtual machine. By way of example, the output data obtained at 508 is output by the virtual device 220 to one of the virtual machines 110.

Having described example procedures and details in accordance with one or more implementations, consider now a discussion of example systems and devices that can be utilized to implement the various techniques described herein.

Example System and Device

Figure 6:
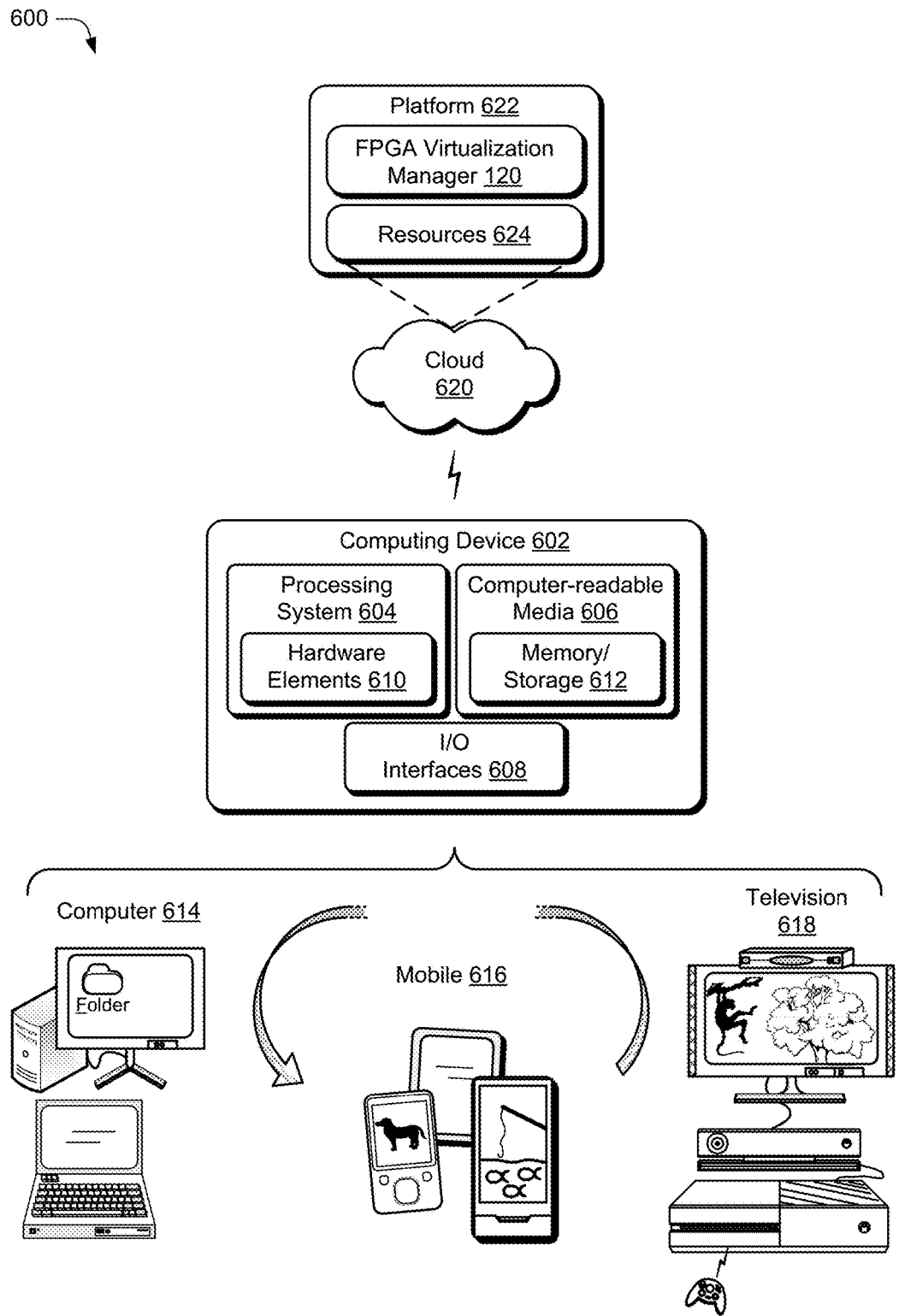
FIG. 6 illustrates an example system including various components of an example device that can be employed for one or more implementations of the techniques described herein.

FIG. 6 illustrates an example system 600 that includes an example computing device 602 that is representative of one or more computing systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, and magnetic disks). The memory/storage 612 may include fixed media (e.g., RAM, ROM, and a fixed hard drive) as well as removable media (e.g., Flash memory, a removable hard drive, and an optical disc). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), and a camera (e.g., which may employ visible or non-visible wavelengths such as infrared frequencies to detect movement that does not involve touch as gestures). Examples of output devices include a display device (e.g., a monitor or projector), speakers, a printer, a network card, and tactile-response device. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 602, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the VM interface 112, the host interface 114, the FPGA virtualization manager 120, and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, or a multi-screen computer. The computing device 602 may also be implemented as the television 618 class of device that includes devices having or connected to generally larger screens in casual viewing environments. These devices include televisions, set-top boxes, and gaming consoles.

The techniques described herein may be supported by these various configurations of the computing device 602 and are not limited to the specific examples of the techniques described herein. For example, the functionality of the FPGA virtualization manager 120 and other modules may also be implemented all or in part through use of a distributed system, such as over a "cloud" 620 via a platform 622 as described below. The FPGA virtualization manager 120 may also be implemented by a host device of the platform 622, such as by one or more servers of a datacenter. The FPGA virtualization manager 120 may also be implemented by an individual computing device 602 or host as described herein.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network. The service may include virtualization services implemented via a suitably configured virtual machine manager module, such as one that includes the FPGA virtualization manager 120.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

EXAMPLE IMPLEMENTATIONS

Example implementations of techniques described herein include, but are not limited to, one or any combinations of the following examples:

Example 1

A method implemented by a computing device, the method comprising: obtaining a field-programmable gate array (FPGA) program that is configured to program FPGAs of a host to provide functionality of a hardware-implementation of a respective program or of a respective device; determining whether the FPGA program is trusted to program the FPGAs by verifying a digital signature associated with the FPGA program; responsive to a determination that the FPGA program is trusted, loading the FPGA program to program the FPGAs to provide the functionality; and generating a virtual device to furnish the functionality to virtual machines by relaying data between the virtual machines and the programmed FPGAs.

Example 2

A method as described in example 1, further comprising receiving a request from one of the virtual machines that requests the FPGA program to program the FPGAs to provide the functionality.

Example 3

A method as described in example 2, wherein the request includes a unique program identifier of the FPGA program and obtaining the FPGA program comprises identifying the FPGA program in a trusted storage location associated with the host using the unique program identifier.

Example 4

A method as described in example 3, wherein verifying the digital signature associated with the FPGA program is based on identifying the FPGA program in the trusted storage location using the unique program identifier.

Example 5

A method as described in example 2, wherein the request includes the FPGA program and obtaining the FPGA program comprises extracting the FPGA program from the request.

Example 6

A method as described in example 5, wherein the FPGA program as included in the request is encrypted and verifying the digital signature associated with the FPGA program comprises: attempting to decrypt the FPGA program using a key that is known to the host and provided by a provider of the FPGA program, wherein: the digital signature is verified responsive to decrypting the FPGA program using the key, or the digital signature is not verified responsive to unsuccessfully decrypting the FPGA program using the key.

Example 7

A method as described in example 1, further comprising: determining whether a different FPGA program is trusted to program the FPGAs by verifying a different digital signature associated with the different FPGA program, the different FPGA program configured to program the FPGAs of the host to provide different functionality; and responsive to a determination that the different FPGA program is not trusted, prohibiting the different FPGA program from programming the FPGAs.

Example 8

A method as described in example 1, further comprising allocating at least a portion of the FPGAs to the hardware implementation of the respective program or the respective device prior to loading the FPGA program.

Example 9

A method as described in example 8, further comprising mapping input and output of the virtual device to respective input and output programmed to the FPGAs.

Example 10

A method as described in example 9, wherein the virtual device relays the data between the virtual machines and the FPGAs according to the mapping.

Example 11

A method as described in example 1, further comprising exposing the virtual device to the virtual machines, the exposed virtual device relaying the data between the virtual machines and the programmed FPGAs to furnish the functionality of the hardware-implementation of the respective program or of the respective device to the virtual machines.

Example 12

A method as described in example 11, wherein the exposed virtual device is exposed to at least one of the virtual machines hosted on the host or the virtual machines hosted on a different host device.

Example 13

A method as described in example 1, wherein the FPGAs are programmable to provide the functionality of two or more hardware-implemented programs or devices simultaneously.

Example 14

A host device comprising: one or more field-programmable gate arrays (FPGAs) that are programmable to have different hardware functions; a processor; and computer-readable media having instructions stored thereon that are executable by the processor to implement an FPGA virtualization manager to perform operations comprising: determining that an FPGA program is trusted to program the one or more FPGAs by verifying a digital signature associated with the FPGA program; loading the FPGA program to program an allocated portion of the one or more FPGAs to provide functionality of a hardware-implemented program or of a device, including configuring the allocated portion to have hardware functions that enable the hardware-implemented program or the device to provide the functionality; and generating a virtual device representative of the hardware-implemented program or of the device, the generated virtual device configured to furnish the functionality to virtual machines hosted by the host device by relaying data between the virtual machines and the hardware-implemented program or the device.

Example 15

A host device as described in example 14, wherein the operations further comprise: determining that a different FPGA program is not trusted to program the one or more FPGAs responsive to being unable to verify a digital signature associated with the different FPGA program; and prohibiting the different FPGA program from programming the one or more FPGAs based on determining that the different FPGA program is not trusted.

Example 16

A host device as described in example 14, further comprising storage configured to store a plurality of FPGA programs and the operations further comprising obtaining the FPGA program from the storage using a unique program identifier included in a request for the FPGA program received from one of the virtual machines.

Example 17

A host device as described in example 14, further comprising storage configured to store a plurality of encryption keys known to the host device and respective FPGA-program providers, each of the encryption keys configured to decrypt a respective FPGA program encrypted with the encryption key to verify a digital signature of the respective FPGA program.

Example 18

A host device as described in example 14, further comprising a mapping of input and output of the virtual device to respective input and output programmed to the one or more FPGAs, the mapping enabling the virtual device to relay the data between the virtual machines and the hardware-implemented program or the device.

Example 19

A host device as described in example 14, wherein the operations further comprise: receiving a request from one of the virtual machines for the FPGA program to program the one or more FPGAs to provide the functionality; and exposing the virtual device to the virtual machine.

Example 20

A method implemented by a host device, the method comprising: receiving, from a virtual machine and at an input of a virtual device, a request requesting functionality furnished by field-programmable gate arrays (FPGAs) of the host device, the FPGAs having been programmed to furnish the functionality by an FPGA program associated with a verified digital signature that indicates the FPGA program is trusted to program the FPGAs; determining a programmed input of the FPGAs that is associated with the input of the virtual device based on a mapping of virtual-device inputs to portions of the FPGAs programmed as inputs; providing data included with the request to the FPGAs via the determined programmed input to enable the FPGAs to furnish the requested functionality with the provided data; obtaining, by the virtual device, output data from the FPGAs that is indicative of a result of the functionality furnished by the FPGAs; and outputting, by the virtual device, the output data to the virtual machine.

CONCLUSION

Although techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter

What is claimed is:

1. A method implemented by a computing device, the method comprising:
    obtaining a field-programmable gate array (FPGA) program that is configured to program FPGAs of a host device to provide functionality of a hardware-implementation of a respective program or of a respective device in response to receiving, from a virtual machine, a request requesting the functionality furnished by the FPGAs of the host device;
    determining whether the FPGA program is trusted to program the FPGAs without crashing the host device by verifying a digital signature associated with the FPGA program based on a list of FPGA-program providers that are trusted, wherein the list of FPGA-program providers is maintained to make trust determinations;
    responsive to a determination that the FPGA program is trusted to program the FPGAs without crashing the host device, loading the FPGA program to program the FPGAs to provide the functionality; and
    generating a virtual device to furnish the functionality to the virtual machine by relaying data between the virtual machines and the programmed FPGAs based on a mapping of inputs of the generated virtual device to portions of the FPGAs programmed as inputs.

2. The method of claim 1, further comprising receiving the request from the virtual machine to program the FPGAs to provide the functionality.

3. The method of claim 2, wherein the request includes a unique program identifier of the FPGA program and obtaining the FPGA program comprises identifying the FPGA program in a trusted storage location associated with the host device using the unique program identifier.

4. The method of claim 3, wherein verifying the digital signature associated with the FPGA program is based on identifying the FPGA program in the trusted storage location using the unique program identifier.

5. The method of claim 2, wherein the request includes the FPGA program and obtaining the FPGA program comprises extracting the FPGA program from the request.

6. The method of claim 5, wherein the FPGA program as included in the request is encrypted and verifying the digital signature associated with the FPGA program comprises:
    attempting to decrypt the FPGA program using a cryptography key that is known to the host device and provided by a provider of the FPGA program, wherein:
        the digital signature is verified responsive to decrypting the FPGA program using the cryptography key, or
        the digital signature is not verified responsive to unsuccessfully decrypting the FPGA program using the cryptography key.

7. The method of claim 1, further comprising:
    determining whether a different FPGA program is trusted to program the FPGAs by verifying a different digital signature associated with the different FPGA program, the different FPGA program configured to program the FPGAs of the host device to provide a different functionality; and
    responsive to a determination that the different FPGA program is not trusted, prohibiting the different FPGA program from programming the FPGAs.

8. The method of claim 1, further comprising allocating at least a portion of the FPGAs to hardware implementation of the FPGA program prior to loading the FPGA program onto the at least a portion of the FPGAs.

9. The method of claim 1, further comprising mapping input and output of the generated virtual device to respective input and output programmed to the FPGAs.

10. The method of claim 9, wherein the virtual device relays the data between the virtual machine and the FPGAs according to the mapping.

11. The method of claim 1, further comprising exposing the virtual device to the virtual machine, the exposed virtual device relaying the data between the virtual machine and the programmed FPGAs to furnish the functionality to the virtual machines.

12. The method of claim 11, wherein the exposed virtual device is exposed to the virtual machine hosted on the host device or the virtual machine hosted on a different host device.

13. The method of claim 1, wherein the FPGAs are programmable to provide the functionality of two or more hardware-implemented programs or devices simultaneously.

14. A host device, comprising:
    one or more field-programmable gate arrays (FPGAs);
    a processor device; and
    computer-readable media having instructions stored thereon that are executable by the processor device to perform operations comprising:
        obtaining a FPGA program that is configured to program the one or more FPGAs of the host device to provide functionality of a hardware-implementation of a program or of a device in response to receiving, from a virtual machine, a request requesting the functionality furnished by the one or more FPGAs of the host device;
        determining whether an FPGA program is trusted to program the one or more FPGAs without crashing the host device by verifying a digital signature associated with the FPGA program based on a list of FPGA-program providers that are trusted, wherein the list of FPGA-program providers is maintained to make trust determinations;
        responsive to a determination that the FPGA program is trusted to program the one or more FPGAs without crashing the host device, loading the FPGA program onto an allocated portion of the one or more FPGAs to provide the functionality; and
        generating a virtual device to furnish the functionality to the virtual machine by relaying data between the virtual machine and the programmed allocated portion of the one or more FPGAs based on a mapping of inputs of the generated virtual device to portions of the FPGAs programmed as inputs.

15. The host device of claim 14, wherein the operations further comprise:
   determining that a different FPGA program is not trusted to program the one or more FPGAs responsive to being unable to verify another digital signature associated with the different FPGA program; and
   prohibiting the different FPGA program from programming the one or more FPGAs in response to determining that the different FPGA program is not trusted.

16. The host device of claim 14, further comprising a storage device configured to store a plurality of FPGA programs and the operations further comprising obtaining the FPGA program from the storage device using a unique program identifier included in the request.

17. The host device of claim 14, further comprising a storage device configured to store a plurality of encryption keys known to the host device and respective FPGA-program providers, each of the encryption keys configured to decrypt a respective FPGA program encrypted with the encryption key to verify a digital signature of the respective FPGA program.

18. The host device of claim 14, further comprising a mapping of input and output of the virtual device to respective input and output programmed to the one or more FPGAs, the mapping enabling the virtual device to relay the data between the virtual machine and the programmed FPGAs.

19. The host device of claim 14, wherein the operations further comprise:
   receiving the request from the virtual machine for the FPGA program to program the one or more FPGAs to provide the functionality; and
   exposing the virtual device to the virtual machine.

20. A computing device, comprising:
one or more field-programmable gate arrays (FPGAs);
a processor device; and
computer-readable media having instructions stored thereon that are executable by the processor device to cause the computing device to:
   obtain a field-programmable gate array (FPGA) program that is configured to program FPGAs of the computing device to provide functionality of a hardware-implementation of a program or of a device in response to receiving, from a virtual machine, a request requesting the functionality furnished by the FPGAs of the computing device;
   determine whether the FPGA program is trusted to program the FPGAs without crashing the computing device by verifying a digital signature associated with the FPGA program based on a list of FPGA-program providers that are trusted, wherein the list of FPGA-program providers is maintained to make trust determinations;
   responsive to determining that the FPGA program is trusted to program the FPGAs without crashing the computing device, load the FPGA program to program the FPGAs to provide the functionality; and
   generate a virtual device to furnish the functionality to the virtual machine by relaying data between the virtual machine and the programmed FPGAs based on a mapping of inputs of the generated virtual device to portions of the FPGAs programmed as inputs.

* * * * *